UNITED STATES PATENT OFFICE 2,366,203

DI-(HALOPHENYL)-DIALKYL ETHERS

John E. Livak, Midland, Mich., assignor to The Dow Chemical Company, Midland, Mich., a corporation of Michigan No Drawing. Application October 2, 1942,
Serial No. 460,555

8 Claims. (Cl. 260—611)

This invention relates to di(halophenyl)-dialkyl ethers and is particularly concerned with compounds having the formula,

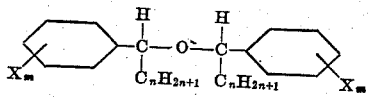

wherein X represents chlorine or bromine, $m$ is an integer not greater than 3, and $n$ is an integer from 1–7, inclusive. I have prepared representative compounds falling within the scope of the foregoing formula and found them to be high boiling viscous liquids or low melting solids, substantially insoluble in water, and somewhat soluble in most organic solvents. These compounds are useful as modifiers in plastic compositions and as insecticidal toxicants.

The new compounds may be prepared by reacting a suitable alpha-halophenyl-alkanol with a dehydrating agent to split out water and form an ether linkage between the aliphatic carbon atoms of two molecules of the original alkanol compound. Representative dehydrating agents which may be employed are sulfuric acid, benzene-sulfonic acid, toluene-sulfonic acid, and camphor-sulfonic acid. The reaction is accomplished by mixing the alkanol compound and dehydrating agent together at a suitable temperature and for a period of time sufficient to provide for the substantial completion of the reaction. The oily layer of the reaction mixture is then separated, successively washed with dilute aqueous alkali and water to remove acid residues, and subjected to distillation under reduced pressure. In this manner the desired alpha,alpha'-di-(halophenyl)-dialkyl ether product is obtained in substantially pure form.

When sulfuric acid is employed as the dehydrating agent, a product containing from about 50 to about 75 per cent of acid by weight is preferred. The amount of acid employed corresponds to from about one-third to equal the volume of the alkanol compound. The reaction may be carried out at any suitable temperature but best results have been obtained when operating at from 20° to 40° C. over a period of from 12–48 hours. Higher operating temperatures tend to reduce the yield of desired ether product with the formation of appreciable quantities of halophenyl-alkenes.

The following examples illustrate the invention, but are not to be construed as limiting the same.

Example 1

188 grams (157 milliliters) of a mixture of alpha-(2-chloro-phenyl)-ethanol (40 per cent) and alpha-(4-chloro-phenyl)-ethanol (60 per cent) was stirred with 157 milliliters of 66 per cent by weight sulfuric acid for 20 hours at a temperature of 20°–25° C. The oily layer of the reaction mixture was then separated, successively washed with dilute aqueous sodium carbonate solution and water, and fractionally distilled under reduced pressure. As products of this distillation there were obtained 15.7 grams of monochloro-styrene, 49.9 grams of unreacted chlorophenyl-alkanols, and 109.9 grams of a mixed alpha,alpha' - di - (mono - chloro - phenyl) - diethyl ether fraction, boiling at 160°–190° C. at 8–10 millimeters pressure. A portion of this product was redistilled to obtain the mixed ether composition as a colorless, substantially odorless, oil boiling at 193°–198° C. at 10 millimeters pressure, and having a density at 20° C. of 1.18 grams per milliliter. A further portion of the original ether fraction was fractionally distilled to isolate alpha,alpha' - di - (2 - chloro - phenyl) - diethyl ether as a colorless viscous oil boiling at 160°–162° C. at 5 millimeters pressure, and alpha,alpha'-di-(4-chloro-phenyl)-diethyl ether as a white crystalline compound boiling at 175°–188° C. at 1 millimeter pressure, and having a melting point of 70°–71° C.

Example 2

380 grams of alpha-(mono-bromo-phenyl)-ethanol and 152 grams of 66 per cent by weight sulfuric acid were mixed together and stirred at a temperature of 25°–30° C. for 18 hours. The mixture was allowed to stand for an additional 48 hours and the oil layer then separated. The oil layer was washed successively with 5 per cent sodium carbonate solution and water and fractionally distilled to obtain 65 grams of alpha, alpha' - di - (mono - bromo - phenyl) - diethyl ether boiling at 178°–191° C. and principally at 188°–190° C. at 5 millimeters pressure. This compound had a specific gravity of 1.49 at 25°/4° C.

Example 3

In a similar manner 148 grams of alpha-(2.4-dichloro-phenyl)-ethanol and 76 grams of 66 per cent by weight sulfuric acid were mixed and heated together at 45°–50° C. over a period of 16 hours. The resulting crude reaction mixture was treated substantially as described in the preceding example to recover 28 grams of alpha,alpha'- di-(2.4-dichloro-phenyl)-diethyl ether boiling at 175°–177° C. at 2 millimeters pressure and having a specific gravity of 1.32 at 25°/4° C.

*Example 4*

59 grams of alpha-(4-chloro-phenyl)-n-propanol and 30 grams of 66 per cent by weight sulfuric acid were heated and stirred together at 25°–30° C. for 18 hours. The oil layer was decanted, successively washed with aqueous sodium carbonate and water, and fractionally distilled to obtain 15 grams of alpha,alpha'-di-(4-chloro-phenyl)-di-n-propyl ether boiling at 165°–170° C. at 4 millimeters pressure and having a specific gravity of 1.14 at 25°/4° C.

*Example 5*

129 grams of alpha-(2-chloro-phenyl)-n-propanol and 110 grams of 60 per cent by weight sulfuric acid were reacted together at temperatures ranging from 25° to 60° C. over a period of 36 hours. The crude reaction mixture was separated, washed, and fractionally distilled substantially as described in the preceding examples to obtain 12 grams of alpha,alpha'-di-(2-chloro-phenyl)-di-n-propyl ether boiling at 155°–157° C. and having a specific gravity of 1.13 at 25°/4° C.

By substituting other alpha-halophenyl-alkanols for those shown in the examples, di-(halophenyl)-dialkyl ethers such as alpha-alpha'-di-(3-bromo-phenyl)-diethyl ether, alpha,alpha'-di-(2.4.6-tribromo-phenyl)-diethyl ether, alpha,alpha'-di-(2.4.5-trichloro-phenyl)-diethyl ether, alpha,alpha'-di-(2-bromo-4-chloro-phenyl)-diethyl ether, alpha,alpha'-di-(4-chloro-phenyl)-di-n-butyl ether, alpha,alpha'-di-(4-bromo-phenyl)-di-isoamyl ether, and alpha,alpha'-di-(2-chloro-phenyl)-di-n-octyl ether may be obtained. Similarly, by reacting mixtures of alpha-halophenyl-alkanols in the manner described, mixed ethers such as alpha-(4-chloro-phenyl)-alpha'-(2-bromo-phenyl)-diethyl ether are formed.

I claim:

1. An alpha,alpha' - di - (halophenyl) - dialkyl ether having the formula

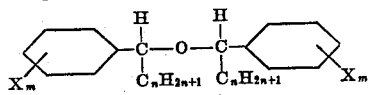

wherein X is selected from the group consisting of chlorine and bromine, $m$ is an integer not greater than 3, and $n$ is an integer from 1 to 7, inclusive.

2. An alpha,alpha'-di-(chloro-phenyl)-dialkyl ether having the formula

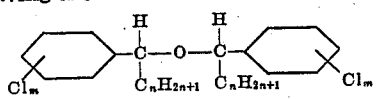

wherein $m$ is an integer not greater than 3, and $n$ is an integer from 1 to 7, inclusive.

3. An alpha,alpha'-di-(mono-chloro-phenyl)-dialkyl ether having the formula

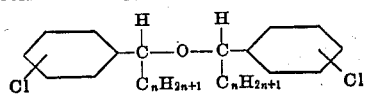

wherein $n$ is an integer from 1 to 7, inclusive.

4. An alpha,alpha'-di-(bromophenyl)-dialkyl ether having the formula

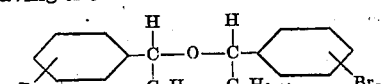

wherein $m$ is an integer not greater than 3, and $n$ is an integer from 1 to 7, inclusive.

5. An alpha,alpha'-di-(mono-bromo-phenyl)-dialkyl ether having the formula

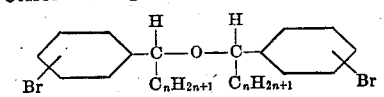

wherein $n$ is an integer from 1 to 7, inclusive.

6. An alpha,alpha' - di - (halophenyl) - diethyl ether having the formula

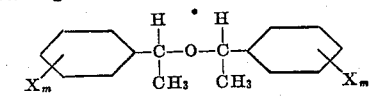

wherein X is selected from the group consisting of chlorine and bromine, and $m$ is an integer not greater than 3.

7. An alpha,alpha'-di-(chloro-phenyl)-diethyl ether having the formula

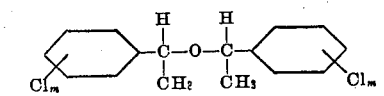

wherein $m$ is an integer not greater than 3.

8. Alpha,alpha'-di-(mono-chloro-phenyl) - diethyl ether having the formula

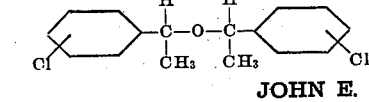

JOHN E. LIVAK.